(12) United States Patent
van Horne et al.

(10) Patent No.: US 12,670,521 B2
(45) Date of Patent: Jun. 30, 2026

(54) MESSAGING INTERFACE FOR MANAGING ORDER CHANGES

(71) Applicant: Maplebear Inc., San Francisco, CA (US)

(72) Inventors: Camille van Horne, San Francisco, CA (US); Philip Goolkasian, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/499,609

(22) Filed: Nov. 1, 2023

(65) Prior Publication Data

US 2024/0062273 A1 Feb. 22, 2024

Related U.S. Application Data

(63) Continuation of application No. 17/851,037, filed on Jun. 28, 2022, now Pat. No. 11,854,066, which is a continuation of application No. 16/677,350, filed on Nov. 7, 2019, now Pat. No. 11,443,362.

(51) Int. Cl.
| | |
|---|---|
| *G06Q 30/06* | (2023.01) |
| *G06F 3/0482* | (2013.01) |
| *G06Q 30/0601* | (2023.01) |
| *H04L 51/046* | (2022.01) |
| *G06F 3/0485* | (2022.01) |

(52) U.S. Cl.
CPC ....... *G06Q 30/0635* (2013.01); *G06F 3/0482* (2013.01); *G06Q 30/0641* (2013.01); *H04L 51/046* (2013.01); *G06F 3/0485* (2013.01)

(58) Field of Classification Search
CPC ............ G06Q 30/0635; G06Q 30/0641; H04L 51/046
See application file for complete search history.

(56) References Cited

U.S. PATENT DOCUMENTS

| | | | |
|---|---|---|---|
| 7,853,492 B1 | 12/2010 | Kirklin et al. | |
| 8,473,326 B1 * | 6/2013 | Griffith ................... | G01S 19/13 |
| | | | 701/410 |
| 9,521,097 B2 * | 12/2016 | Tomlinson .............. | H04L 51/04 |
| 10,664,885 B2 * | 5/2020 | Lee .................... | G06Q 30/0643 |
| 2003/0126130 A1 | 7/2003 | Martino et al. | |

(Continued)

OTHER PUBLICATIONS

PCT International Search Report and Written Opinion, PCT Application No. PCT/US2020/040376, Sep. 21, 2020, 19 pages.

(Continued)

*Primary Examiner* — Alvin H Tan
(74) *Attorney, Agent, or Firm* — Fenwick & West LLP

(57) ABSTRACT

In a delivery service, a picker retrieves items specified in an order by a customer. If a picker encounters an issue with an item in the order, the picker may select, via a user interface, the item and an associated template message, which requests input from the customer regarding a course of action for the item, to send to the customer. The customer may select, via another user interface, a template message describing a course of action for the item. In response to receiving one of a subset of template messages, the online concierge system displays via the user interface, a set of replacement options to the customer, who may select one of the replacement options to be sent to the picker with the template message.

20 Claims, 11 Drawing Sheets

Picker Order Interface 400C

(56)  References Cited

U.S. PATENT DOCUMENTS

| 2012/0209746 | A1 | 8/2012 | Eisner et al. |
| 2014/0052562 | A1* | 2/2014 | Oliveira ............. G06Q 30/0621 |
| | | | 705/26.5 |
| 2016/0140632 | A1 | 5/2016 | Kandala et al. |
| 2016/0148302 | A1 | 5/2016 | Carr et al. |
| 2016/0162715 | A1 | 6/2016 | Luk et al. |
| 2017/0024806 | A1 | 1/2017 | High et al. |
| 2017/0220986 | A1 | 8/2017 | Putcha et al. |
| 2018/0284453 | A1 | 10/2018 | Irvin et al. |
| 2020/0151665 | A1* | 5/2020 | Fitzgerald .............. G06Q 10/08 |

OTHER PUBLICATIONS

United States Office Action, U.S. Appl. No. 17/851,037, Feb. 23, 2023, 11 pages.

\* cited by examiner

100

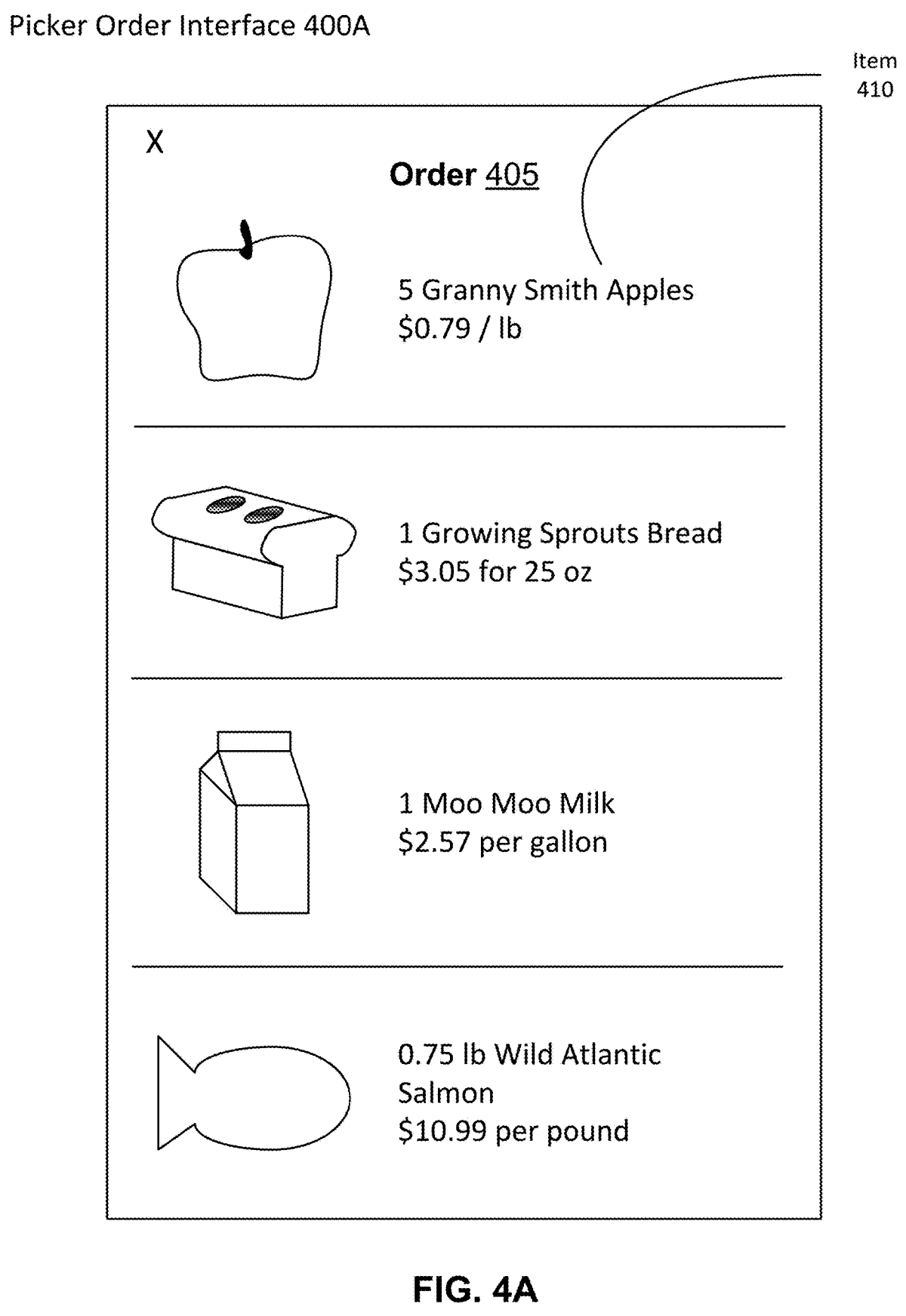

Picker Order Interface 400A

Item 410

Order 405

5 Granny Smith Apples
$0.79 / lb

1 Growing Sprouts Bread
$3.05 for 25 oz

1 Moo Moo Milk
$2.57 per gallon 0.75 lb Wild Atlantic Salmon
$10.99 per pound

FIG. 4A

Picker Order Interface 400B

Picker Order Interface 400C

Picker Order Interface 400D

600

700

MESSAGING INTERFACE FOR MANAGING ORDER CHANGES

CROSS-REFERENCE TO RELATED APPLICATION

This application is a continuation of U.S. patent application Ser. No. 17/851,037, filed on Jun. 28, 2022, which is a continuation of U.S. patent application Ser. No. 16/677,350, filed on Nov. 7, 2019, now U.S. Pat. No. 11,443,362, each of which is incorporated by reference in its entirety.

BACKGROUND

This disclosure relates generally to sending and receiving order changes. More particularly, the disclosure relates to communicating order changes via chat interfaces in an online concierge system.

In current online concierge systems, a customer adds items to an online shopping cart from a list of items at a retailer. These items create the customer's order, which is retrieved by a picker at the retailer who "shops" for the customer. Though customers may initially specify items in the order, the picker may encounter issues as they fulfill orders. Some commonly encountered issues may include an item being out of stock, low in stock, or low in quality. However, customers may have different preferences of what to do about an issue, so pickers need a way to address these issues with a customer to receive information about their preferences for the order. Additionally, customers need a way to respond to these issues, such as accepting a replacement option suggested by a picker or requesting a refund for an item. For example, if an item is out of stock in one flavor, but is available in another flavor, the picker may want to ask the customer if they would like to replace the unavailable item with the available item. Further, the customer may not like the other flavor and prefer a refund or other remedy for the item rather than the replacement option.

SUMMARY

To streamline the resolution of issues with items in an order, an online concierge system generates chat communication channels between customers and pickers as part of a delivery service, such as a grocery delivery service. When a picker is fulfilling an order and encounters an issue with an item, the picker can initiate a chat with a customer to resolve the issue. Using a picker mobile application, the picker may view a picker order interface including a scrollable list of items in the order and select the item. The picker order interface may display a set of predetermined messages, or template messages, about the item indicating what the issue is and, in some embodiments, suggesting a course of action for the item. The online concierge system sends this template message as a message to the customer, which the customer views through a customer ordering interface from a customer mobile application. The customer ordering interface may also display a scrollable list of remedies for the issue, which describe possible courses of action for the item, such as picking a replacement item, changing the quantity of the item, or receiving a refund for the item. The customer may choose a template message associated with a course of action, which is sent to the picker.

More particularly, in some embodiments, the online concierge system receives an order, which is comprised of a plurality of items. The online concierge system displays the order via a chat interface in a scrollable list of items. A picker may interact with this chat interface to select an item from the scrollable list, indicating that there is an issue with the item. The online concierge system receives the selection of the item, and, in response, displays, via the chat interface, a set of template messages specifying the item. The online concierge system receives a selection of one of the set of template messages, as chosen by the picker, and transmits the template message to a client device associated with a customer. The customer may choose a course of action for the item, such as removing the item from the order, and the online concierge system transmits a message indicating this course of action to the picker.

In some embodiments, the online concierge system receives an order from a customer and transmits the order to a client device associated with a picker. When a picker encounters an issue with an item in the order, the picker indicates so via a mobile application on the client device, and the online concierge system receives, via a chat interface, a message from the client device indicating that an item in the order is not available and requesting a course of action for the item. The online concierge system displays, via the chat interface, a set of template messages indicating possible courses of action for the item, such as replacing the item with a related item. The customer selects a template message, and in response to receiving one of a subset of template messages as the selection, the online concierge system displays a set of replacement options for the item. The customer chooses a replacement option, and the online concierge system receives a selection of one of the set of replacement options. The online concierge system then transmits the template message to the picker indicating the course of action for the item.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 4A is an example of a picker order interface depicting an order on the picker mobile application, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
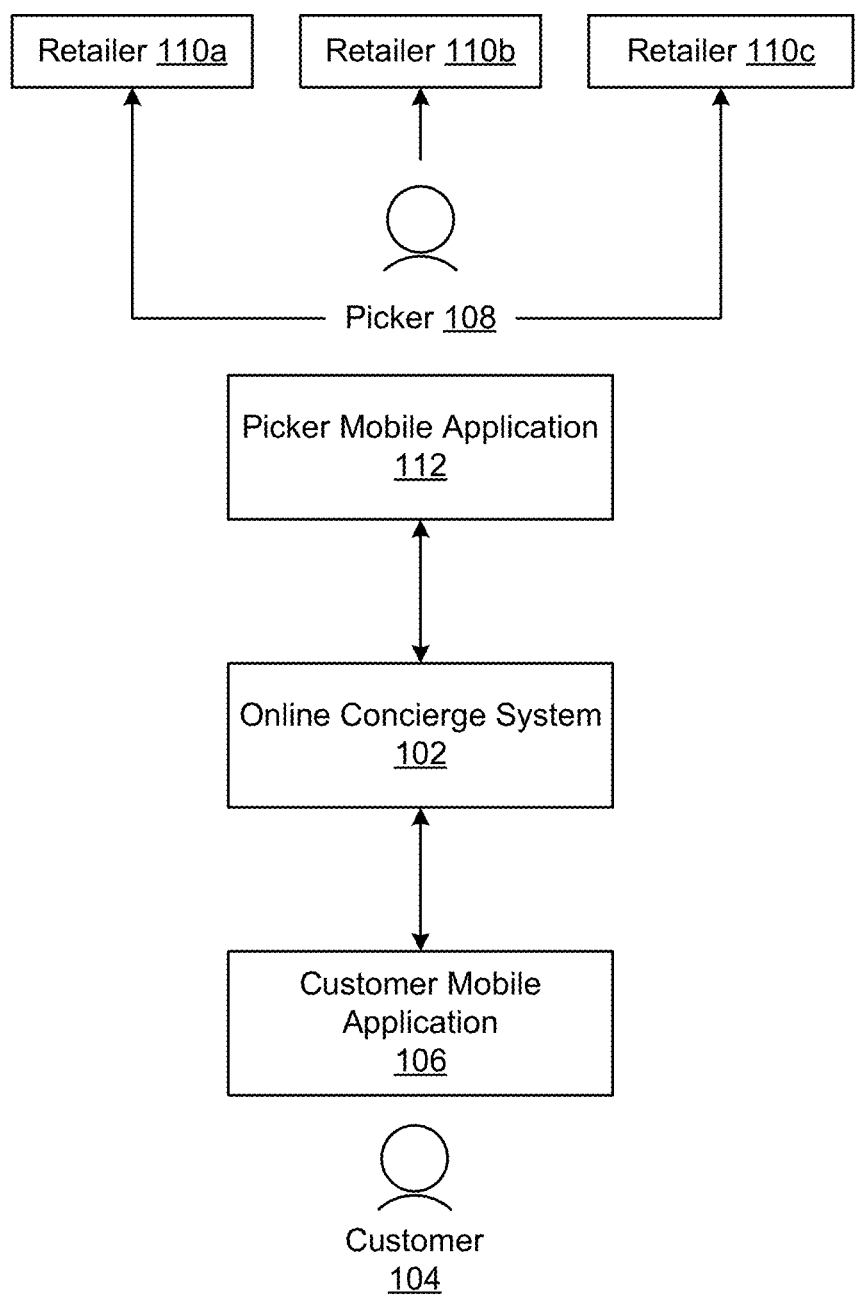
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
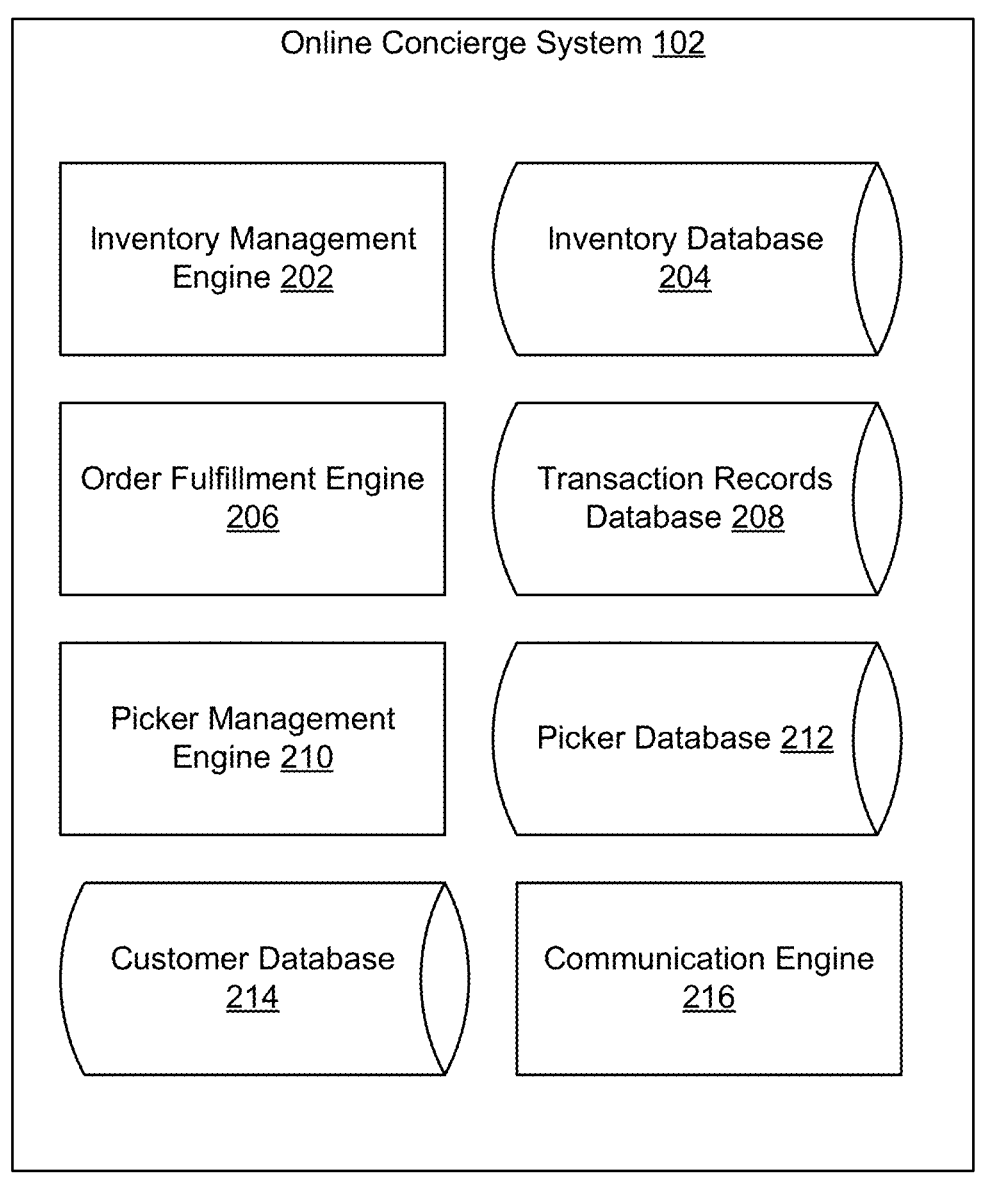
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The online concierge system 102 may use a communication engine 216 that transmits information between the customer mobile application 106 and the picker mobile application 112. The information may be sent in the form of messages, such as texts or emails, or notifications via application, among other forms of communication. The communication engine 216 may receive information from each application about the status of an order, the location of a customer 104 in transit, issues with items in an order, and the like. The communication engine 216 determines a message or notification to send to a customer 104 or picker 108 based on this information and transmits the notifications to the appropriate application. In one embodiment, the online concierge system 102 may receive messages composed via a user interface of the picker mobile application 112 and transmit the messages to the customer mobile application 106 (or vice versa) via the communication engine 216. For example, a picker 108 may compose, via a picker order interface, a message indicating that an item of an order is not available. The online concierge system 102 may receive the message from the picker mobile application 112 and transmit the message to the customer mobile application 106 associated with the order. The customer 104 may interact with a customer ordering interface to indicate a course of action for the item, such as to remove the item from the order. The online concierge system 102 receives this information and transmits it in the form of a message to the picker mobile application 112.

Figure 3A:
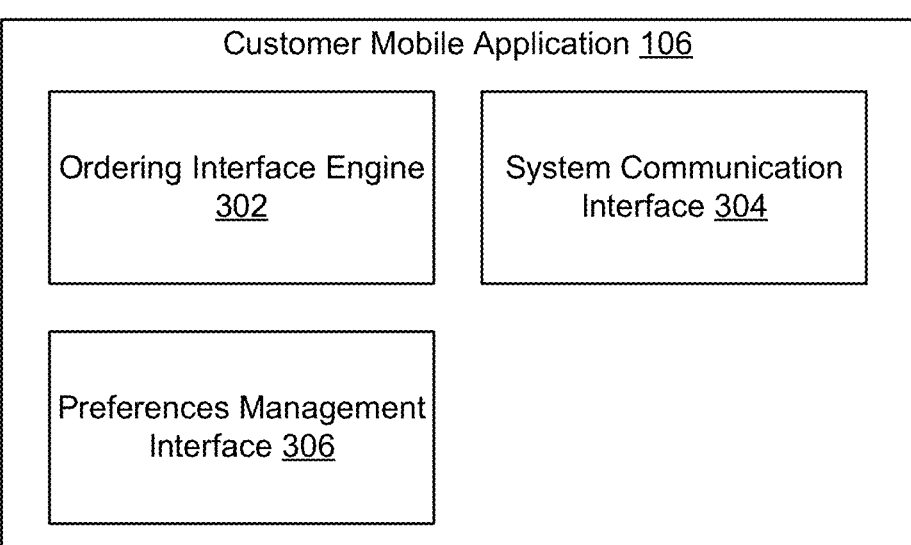
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
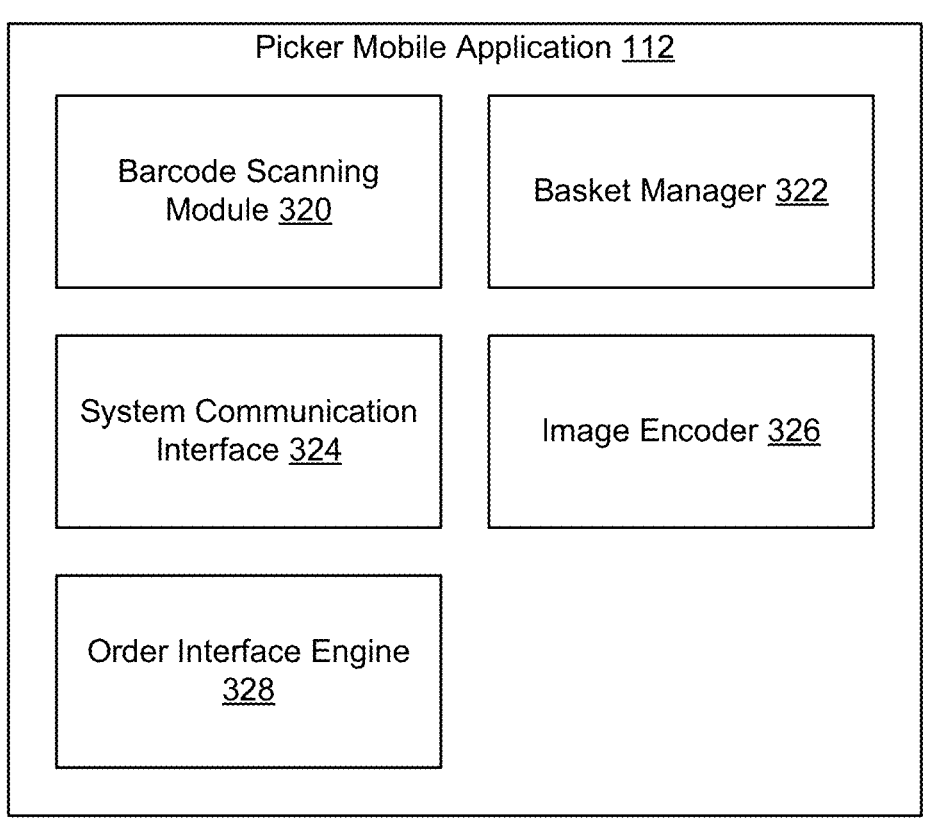
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to the order interface engine 328, which generates a picker order interface.

A picker order interface is an interactive interface through which pickers 108 may interact message with customers 104 and receive notifications regarding the status of orders they are assigned. Pickers 108 may view their orders through the picker order interface and indicate when there is an issue with an item in an order, such as the item being out of stock or of poor quality. A picker 108 may draft a message to a customer 104 associated with the order requesting clarification about what to do for the item given the issue. The picker order interface displays template messages for the picker 108 to choose from regarding the item and the picker 108 may edit the template message to include more information about the item or a question for the customer 104. The picker 108 communicate back and forth with the customer 104 until the issue is resolved.

FIG. 4A is an example of a picker order interface 400A depicting an order 405 on the picker mobile application 112, according to one embodiment. A picker 108 may use the picker order interface 400A when gathering items 410 for an order 405 at a retailer 110. The picker order interface 400A displays a scrollable list of items 410 in the order 405, including the brand or type of the item 410, the quantity ordered, the price of the item 410, and an image of the item 410. In other embodiments, the scrollable list may include other information about the items 410, such as quantity of each item 410 left in stock, location of each item 410 at the retailer 110, or name of the customer 104 associated with the order 405. A picker 108 may scroll through the list to view more items 410 of the order 405 or may interact with an icon representing the item 410 to view more information about the item 410.

Figure 4B:
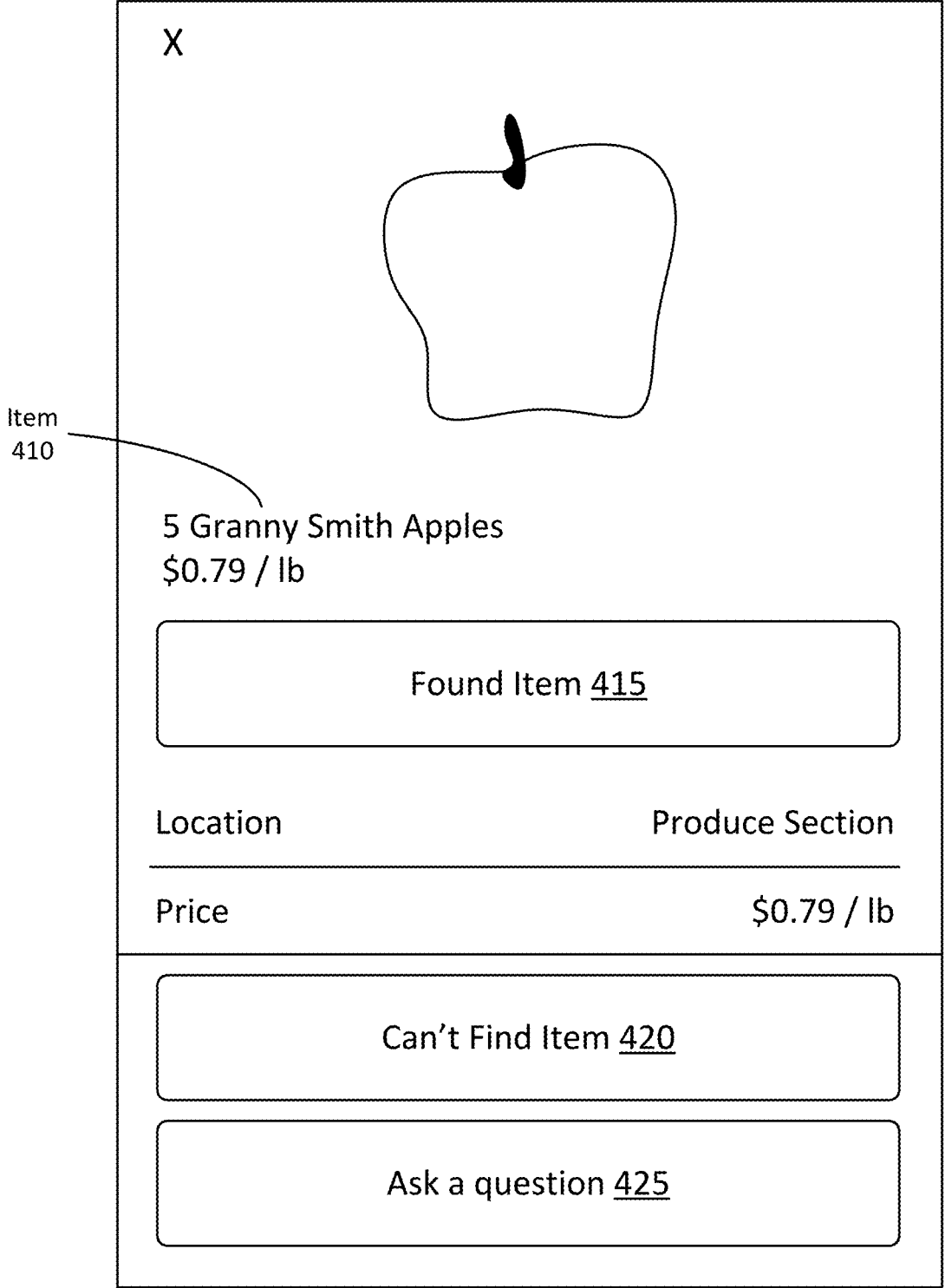
FIG. 4B is an example of a picker order interface depicting an item from an order on the picker mobile application, according to one embodiment.

FIG. 4B is an example of a picker order interface 400B depicting an item 410 from an order 405 on the picker mobile application 112, according to one embodiment. The picker ordering interface 400B displays the item 410 (e.g., "Granny Smith Apples") and shows a price of the item 410, the location of the item 410 at the retailer 110, and the quantity ordered of the item 410. In other embodiments, the picker order interface 400B may also display the other information about the item 410, such as a picture of the location of the item 410 at the retailer 110. The picker ordering interface 400B includes several buttons and icons the picker 108 may interact with. The picker 108 may interact with the "Found Item" 415 button to indicate that they have found the item 410 at the retailer 110 and retrieved the item 410 for the order 405. If the picker 108 cannot find the item 410, the picker 108 may interact with the "Can't Find Item" 420 button to request a desired course of action for the item 410 from the customer 104. The picker 108 may also interact with the "Ask a question" 425 button to send a custom message to the customer 104.

Figure 4C:
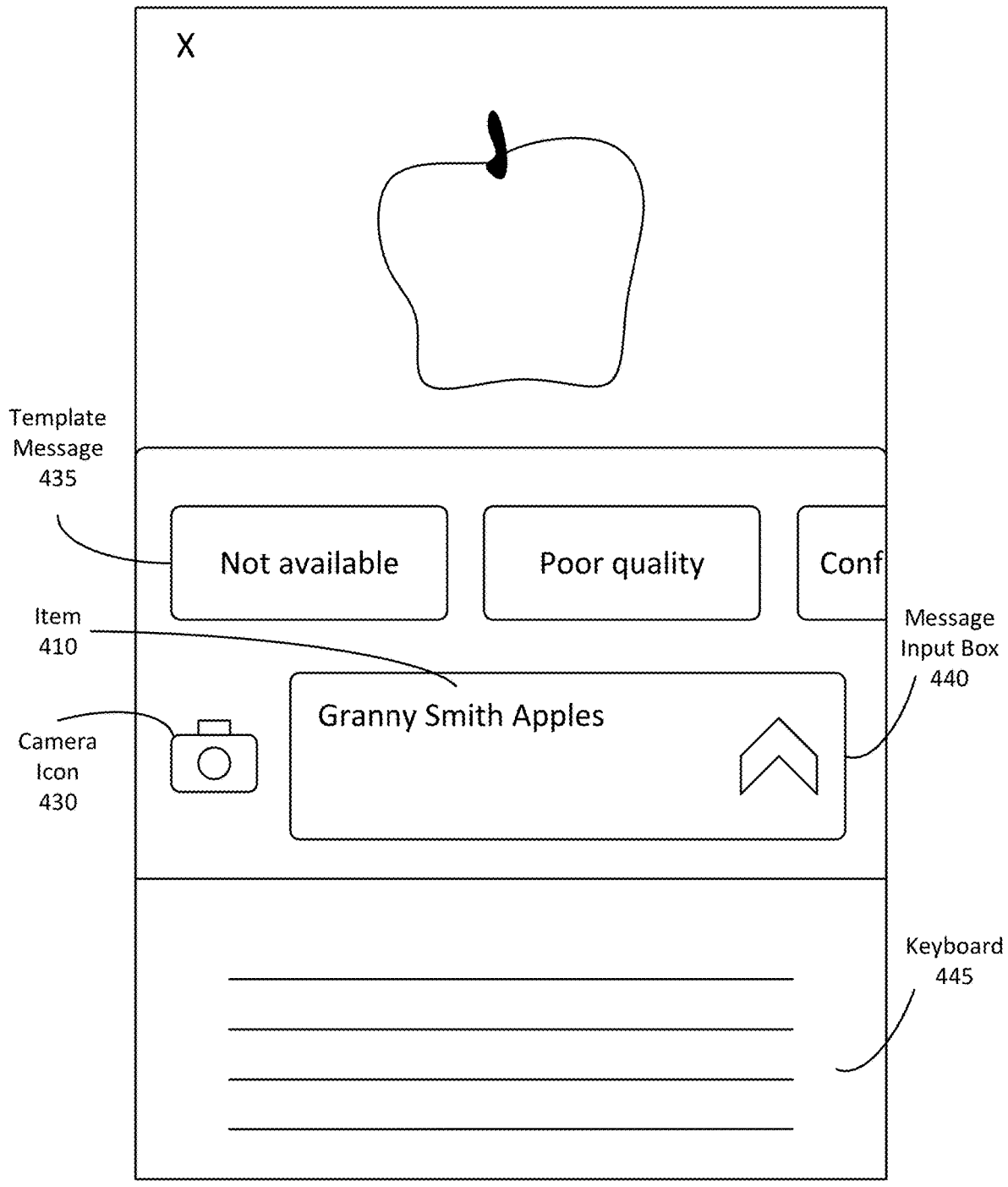
FIG. 4C is an example of a picker order interface displaying template messages for an item on the picker mobile application, according to one embodiment.

FIG. 4C is an example of a picker order interface 400C displaying template messages 435 for the item 410 on the picker mobile application 112, according to one embodiment. In some embodiments, this picker order interface 400C is displayed after the picker 108 interacts with the "Can't Find Item" 420 button from FIG. 4B. The picker order interface 400C displays multiple template messages 435 in a slider (or, in other embodiments, a scrollable list). Template messages may include "Not available," which indicates that the item 410 is not in stock at the retailer 110, and "Poor quality," which indicates that the retailer 110 has the item 410 but the quality of the item 410 is not good (e.g., the apples are bruised or moldy). The picker order interface 400C may also include other template messages 435 not shown in FIG. 4C. For example, other template messages 435 may indicate a specific brand or type of the item 410 is not available or the item 410 is only available in smaller quantity than ordered. The picker order interface 400C includes a message input box 440 where the picker 108 may input and edit text by interacting with the keyboard 445. The message input box 440 shows the item 410, and the picker 108 may choose a template message 435 to be displayed in the message input box 440 that may be sent as a message to the customer 104. Additionally, the picker 108 may interact with the camera icon 430 to take a picture of replacement options or to show the quality of the item available at the retailer 110 and send the picture to the customer 104 along with the message.

Figure 4D:
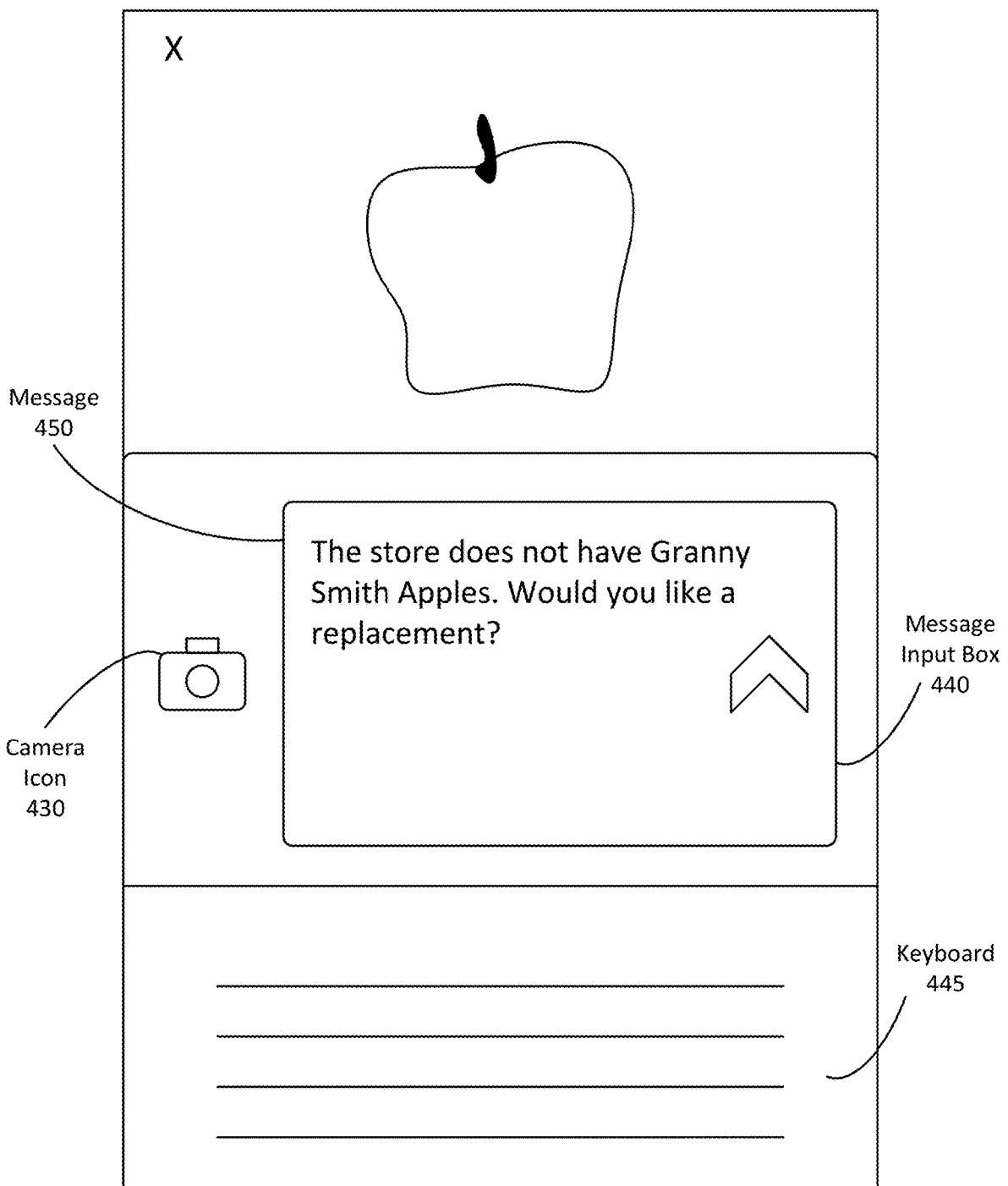
FIG. 4D is an example of a picker order interface displaying a message for an item on the picker mobile application, according to one embodiment.

FIG. 4D is an example of a picker order interface 400D displaying a message 450 for the item 410 on the picker mobile application 112, according to one embodiment. In this embodiment, the picker 108 chose the template message 435 "Not available," indicating that the retailer 110 does not have the item 410 in stock. In the picker order interface 400D, the message input box 440 is populated with a message 450 corresponding to the chosen template message 435 and including the item 410. The picker 108 may edit the message 450 in the message input box 440 using the keyboard 445 to add custom information to the message 450 before sending it to the customer 104.

Figure 5A:
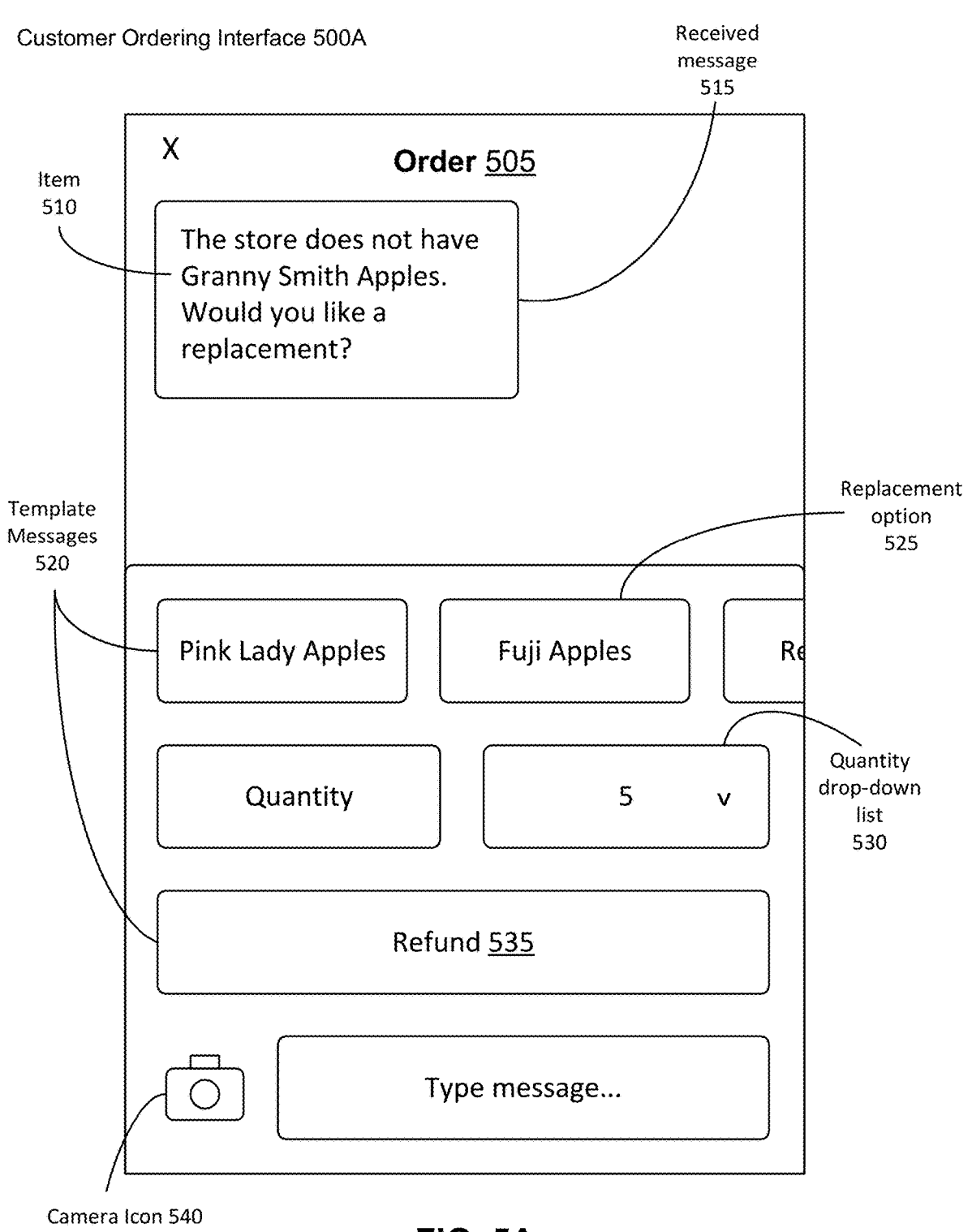
FIG. 5A is an example of a customer ordering interface displaying template messages for an item in an order on the customer mobile application, according to one embodiment.

FIG. 5A is an example of a customer ordering interface 500A displaying template messages 520 for the item 510 in the order 505 on the customer mobile application 106, according to one embodiment. The customer ordering interface 500A displays a received message 515 from a picker 108 indicating that there is an issue with an item 510 from a customer's 104 order 505. Along with the received message 515, the customer ordering interface 500A includes template messages 520 the customer 104 may choose to designate a course of action for the item 510. As shown in FIG. 5A, a customer 104 may choose a template message 520 by interacting with buttons on the customer ordering interface 500A. The template messages 520 indicate possible courses of action, such as requesting a replacement option 525 for the item 510, requesting a new quantity of the item 510 (chosen via a quantity drop-down list 515), or requesting a refund 535 of the item 510, among other remedies for the item.

In the customer ordering interface 500A, the replacement options 525 for the item 510 "Granny Smith Apples" are displayed in a slider. Replacement options are items similar to the item 510, and the customer 104 may interact with the replacement options 525 by scrolling through the slider or selecting a replacement option to replace the item 510. In FIG. 5A, the replacement options 525 include "Fuji Apples" and "Pink Lady Apples." In some embodiments, the customer 104 may choose a replacement option 525 by searching a database of replacement options 525 available at the retailer 110. In other embodiments, the slider includes a "Show More Options" button that the customer 104 may interact with to see more replacement options 525. The customer ordering interface 500A also allows the customer 104 to alter the quantity of the item 510 using the quantity drop-down list 530, or, in some embodiments, by manually entering a quantity. The customer 104 may also may interact with the camera icon 540 to take a picture of an item 510 for the picker 108 to find as a replacement. In other embodiments, the customer 104 may type a message to the picker 108, instead of using a template message 520, to indicate a custom course of action for the item 510.

Figure 5B:
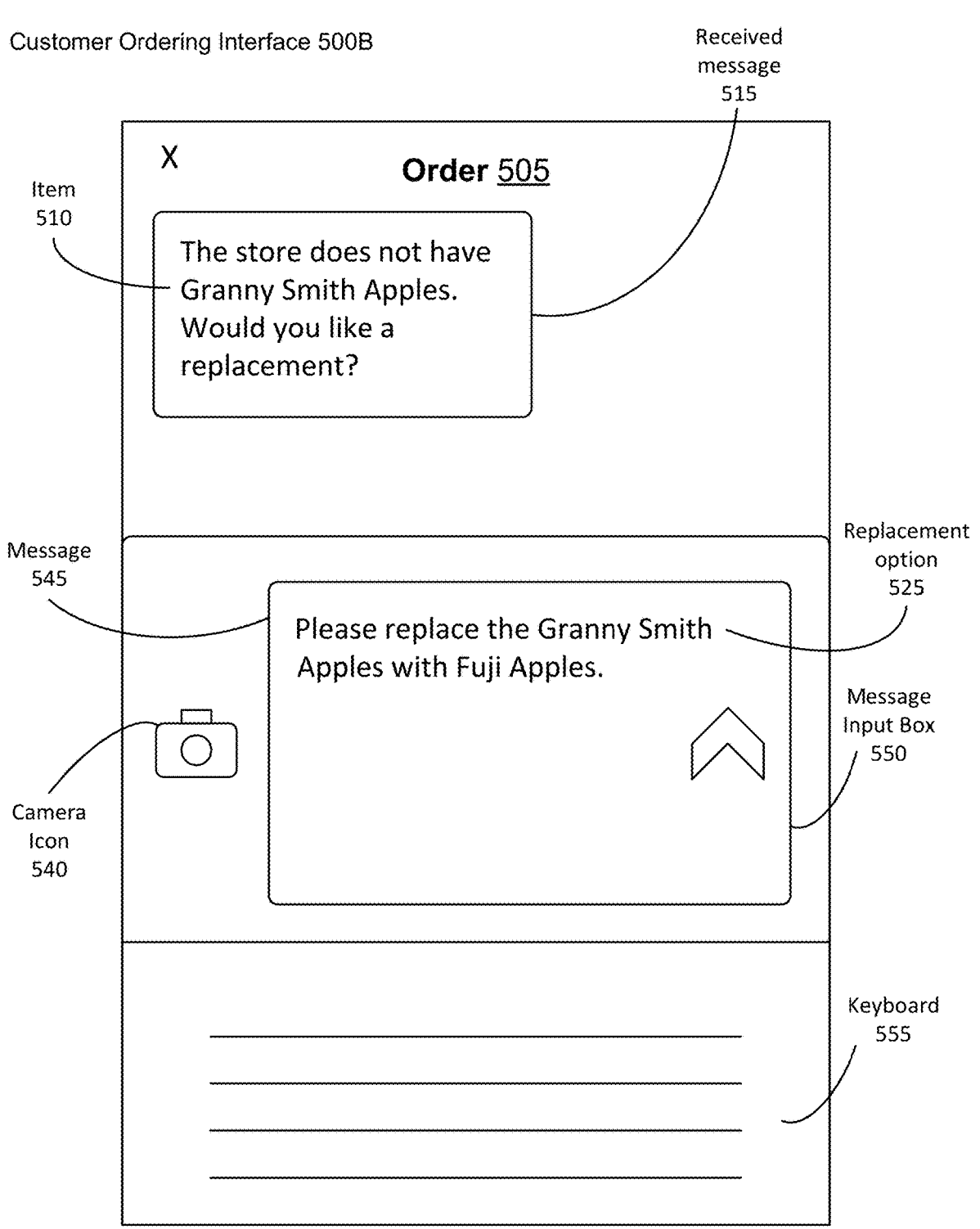
FIG. 5B is an example of a customer ordering interface displaying a template message for replacing an item on the customer mobile application, according to one embodiment.

FIG. 5B is an example of a customer ordering interface 500B displaying a message 545 for replacing the item 510 on the customer mobile application 106, according to one embodiment. In this embodiment, the customer 104 chose the replacement option 525 "Fuji Apples." This selection caused the CMA 106 to populate the message input box 440 with the template message 520, which, along with the item 510 "Granny Smith Apples," comprises the message 545. Further, the customer 104 may interact with the keyboard 445 to alter the message 545 before sending the message 545 to the picker 108. In further embodiments, the picker 108 customer 104 may continue to message back and forth using the picker order interface 400 and the customer ordering interface 500, respectfully, to resolve any other issues with the order 505.

Figure 6:
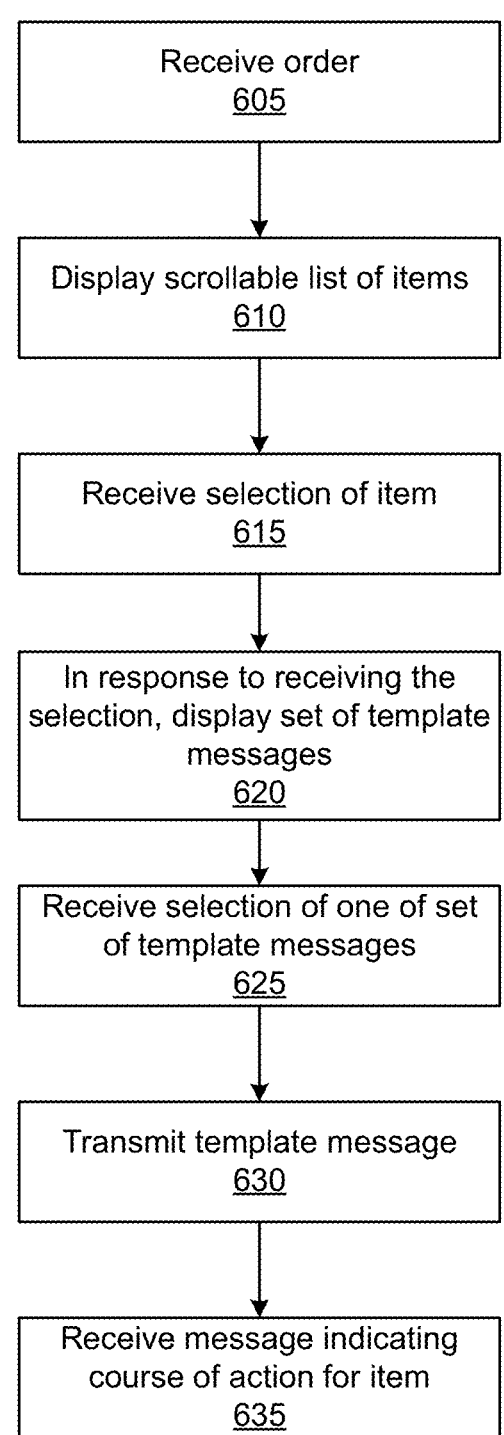
FIG. 6 is a flowchart illustrating a process for using the picker mobile application to determine a course of action for an item, according to one embodiment.

FIG. 6 is a flowchart illustrating a process for using the picker mobile application 112 to determine a course of action for an item, according to one embodiment. The online concierge system 102 receives 605 an order from a customer 104 via the CMA 106. The order may specify a variety of items for purchase, such as grocery items or household goods, and a retailer 110. The online concierge system 102 designates a picker 108 at the retailer 110 to retrieve the items in the order and displays 610, via the PMA 112, a scrollable list of the items in the order to the picker 108. In some embodiments, the list of items is displayed in other forms instead of a scrollable list, such as a slider of items or a checklist of items. The scrollable list may include information about the items, such as price, quantity ordered, and whether the item is in stock.

The picker 108 scrolls through the scrollable list of items to designate items that have been found and retrieved for the order and designate issues with items. The online concierge system 102 receives 615 a selection of an item in the order from the PMA 112, the selection indicating that the order needs to be changed because there is an issue with the item. Issues may include the item being out of stock, lacking in quantity, of poor quality, or otherwise unavailable. In response to receiving the selection of the item from the picker 108, the online concierge system 102 displays 620 a set of template messages to the picker 108 via a picker order interface. The template messages each specify a different issue with the order that requires resolution from the customer 104. Examples include that the item is not available at the retailer 110, the item is of poor quality, the item is not available in the quantity ordered, and the item is not available in the type or brand ordered. In some embodiments, each item is associated with a different set of template messages. For example, a produce item may be associated with a template message indicating that the item is poor quality, while a cleaning item is not.

The online concierge system 102 receives 625 a selection from the picker 108 of one of the template messages. The picker order interface displays the template message, and the picker 108 may edit the template message to add custom information, such as alternative options to resolve the issue with the item or a picture of the options available at the retailer 110. Once the picker 108 indicates via the picker order interface that the template message, edited or not, is ready to send, the online concierge system 102 transmits 630 the template message to the CMA 106 to obtain information from the customer 104. The CMA 106 displays, via a customer ordering interface, the template message, as further described in FIG. 7, and the online concierge system 102 receives 635 from the customer 104 a message indicating a course of action for the item.

It is appreciated that although FIG. 6 illustrates a number of interactions according to one embodiment, the precise interactions and/or order of interactions may vary in different embodiments. For example, in some embodiments, the online concierge system 102 transmits more messages from the PMA 112 to the CMA 106 regarding other issues with the order.

Figure 7:
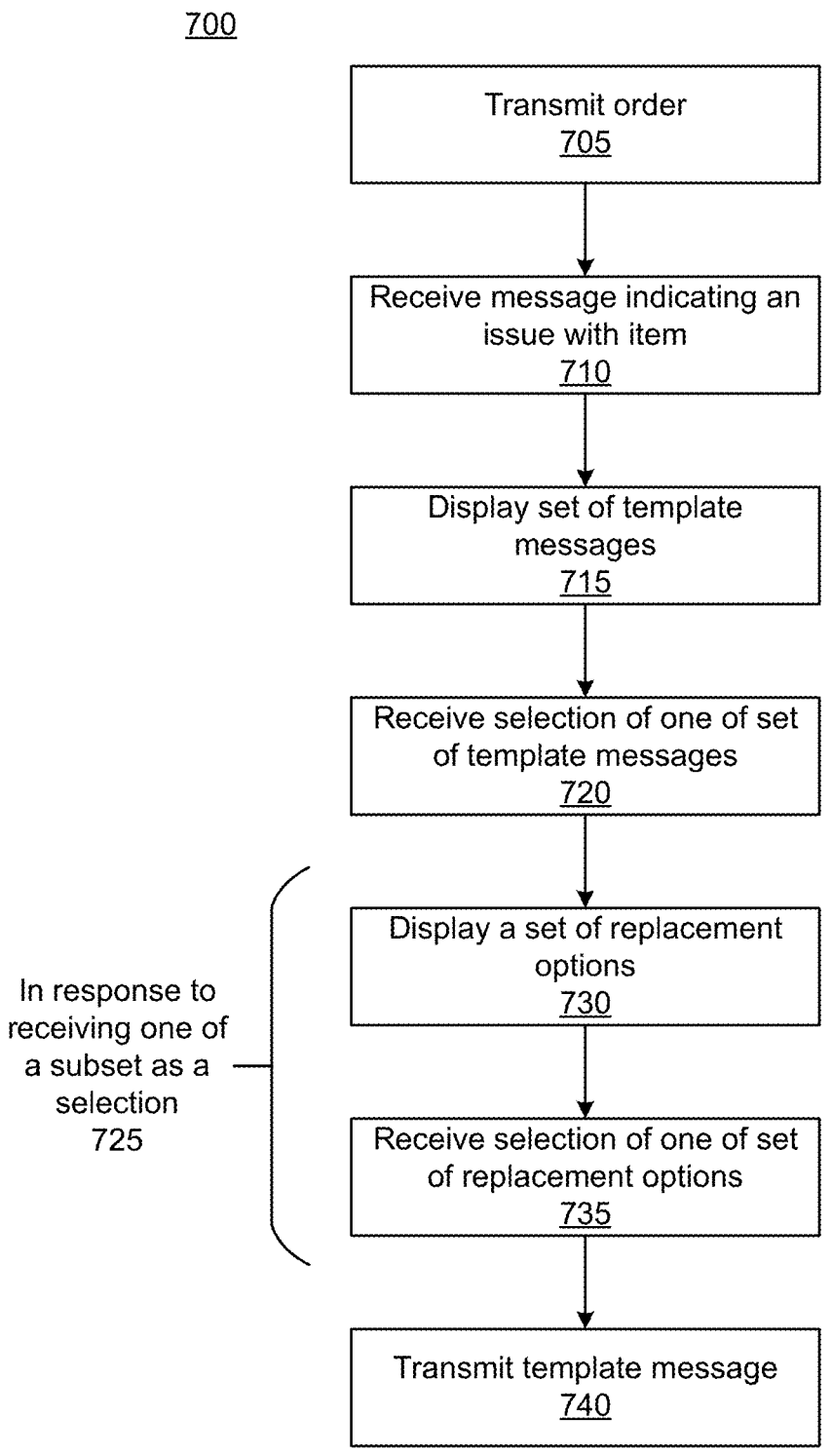
FIG. 7 is a flowchart illustrating a process for using the customer mobile application to determine a course of action for an item, according to one embodiment.

FIG. 7 is a flowchart illustrating a process for using the customer mobile application 106 to determine a course of action for an item, according to one embodiment. A customer 104 selects a variety of items for an order using a customer ordering interface on the CMA 106, and the online concierge system 102 transmits 705 the order to the PMA 112. A picker 108 views the order via a picker order interface and retrieves the items in the order at a retailer 110 to fulfill the order. When the picker 108 encounters an issue with an item, the picker 108 sends a message to the customer 104 indicating that there is an issue with the item, and the online concierge system 102 receives 710 the message from the PMA 112.

The online concierge system 102 displays 715, via the customer ordering interface, a set of template messages the customer 104 may use to respond to the message from the picker 108. Each template message indicates a course of action for the item, such as to remove the item from the order and obtain a refund or to replace the item with a different item. In some embodiments, the template message may include another remedy for the item, such as a request for information regarding available replacement options in-store from the picker 108. The customer ordering interface may also display the option for the customer 104 to change the quantity of the item.

The online concierge system 102 receives 720 a selection of one of the set of template messages from the customer 104. In this embodiment, the selection indicates that the customer 104 would like to replace the item with another item. In response to receiving one of a subset of the template messages as the selection 725, the online concierge system 102 displays 730, via the customer ordering interface, a set of replacement options and receives 735 a selection of one of the replacement options, which is inserted into the template message. In this embodiment, the subset off template messages request that the picker 108 substitute a replacement item for the item, whereas the other template messages do not. For example, the customer 104 may receive a message indicating that the item "Moo Moo organic milk" is not available and selects a template message describing a replacement option for the item. The customer ordering interface may display multiple replacement options, such as "Moo Moo whole milk" or "Dairy Farms organic milk," which are different types and brands of milk. In other embodiments, the customer ordering interface display other remedies, such as a refund for the item. The customer 104 may select one of the replacement options or find an option in a database of items. The online concierge system displays the template message to the customer 104 describing the replacement option, which the customer 104 can edit. The online concierge system then 102 transmits 740 the template message to the picker 108.

It is appreciated that although FIG. 7 illustrates a number of interactions according to one embodiment, the precise interactions and/or order of interactions may vary in different embodiments. For example, in some embodiments, if the customer 104 selects a template message that does not request a replacement for the item, the online concierge system does not display replacement options for the item.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method, comprising:
   receiving an order, the order comprising a plurality of items;
   causing to display, via a chat interface on a picker device, a scrollable list of the plurality of items;
   receiving, via the chat interface, a selection of an item from the scrollable list, wherein the selection indicates that the item has an issue encountered during fulfillment of the order;
   responsive to receiving the selection, causing to display, via the chat interface, a set of two or more template messages within a chat window specific to the order, wherein the set of two or more template messages is selected based on the selected item, wherein each of the template messages in the set specifies a potential issue, wherein the set of two or more template messages includes messages associated with one or more potential issues with the item, wherein each template message is an editable message for a picker to specify an issue with the item;
   receiving a selection of one of the template messages in the set;
   receiving, via the chat interface, one or more edits to the selected template message;
   transmitting an edited template with the one or more edits to a client device, wherein transmitting the edited template message causes the chat interface on the picker device to render the edited message in the chat window specific to the order;
   receiving, via the chat interface on the picker device, information related to a client response message rendered in the chat window specific to the order; and
   processing the client response message to display, via the chat window, a message indicating a course of action for the item.

2. The computer-implemented method of claim 1, wherein receiving the order comprises:

receiving, from the client device, the plurality of items that are selected by a customer; and receiving a selection of a location to which the items are to be delivered; and wherein causing to display, via the chat interface, the scrollable list of the plurality of items comprises causing the scrollable list to be displayed at the chat interface of a picker for the picker to gather the items on behalf of the customer.

3. The computer-implemented method of claim 1, wherein causing to display, via the chat interface, the set of two or more template messages comprises:

displaying a first template message that indicates the item is in a poor quality; and displaying a second template message that indicates the item is not available.

4. The computer-implemented method of claim 1, wherein causing to display, via the chat interface, the set of two or more template messages comprises displaying the set of two or more template messages in a slider or in a scrollable list.

5. The computer-implemented method of claim 1, wherein causing to display, via the chat interface, the set of two or more template messages comprises displaying one of the template messages that indicates to remove the item from the order.

6. The computer-implemented method of claim 1, wherein receiving, via the chat interface, one or more edits to the selected template message comprises:

causing the chat interface to display a camera icon; and receiving a picture of a replacement option from a picker taking the picture at a warehouse location.

7. The computer-implemented method of claim 1, wherein transmitting the edited template with the one or more edits to the client device comprises:

providing one or more replacement options that are transmitted along with the edited template;

retrieving user data describing previous orders and previously selected replacement options; and ranking a set of replacement options based on the user data.

8. The computer-implemented method of claim 1, wherein receiving a message indicating a course of action for the item comprises receiving a selection from a customer to replace the item with another item that is suggested in the template message.

9. A system, comprising:

one or more processors; and memory coupled to the one or more processors, the memory configured to store code comprising instructions, wherein the instructions, when executed by the one or more processors, cause the one or more processors to perform steps comprising:

receiving an order, the order comprising a plurality of items;

causing to display, via a chat interface on a picker device, a scrollable list of the plurality of items;

receiving, via the chat interface, a selection of an item from the scrollable list, wherein the selection indicates that the item has an issue encountered during fulfillment of the order;

responsive to receiving the selection, causing to display, via the chat interface, a set of two or more template messages within a chat window specific to the order, wherein the set of two or more template messages is selected based on the selected item, wherein each of the template messages in the set specifies a potential issue, wherein the set of two or more template messages includes messages associated with one or more potential issues with the item, wherein each template message is an editable message for a picker to specify an issue with the item;

receiving a selection of one of the template messages in the set;

receiving, via the chat interface, one or more edits to the selected template message;

transmitting an edited template with the one or more edits to a client device, wherein transmitting the edited template message causes the chat interface on the picker device to render the edited message in the chat window specific to the order;

receiving, via the chat interface on the picker device, information related to a client response message rendered in the chat window specific to the order; and processing the client response message to display, via the chat window, a message indicating a course of action for the item.

10. The system of claim 9, wherein receiving the order comprises:

receiving, from the client device, the plurality of items that are selected by a customer; and receiving a selection of a location to which the items are to be delivered; and wherein causing to display, via the chat interface, the scrollable list of the plurality of items comprises causing the scrollable list to be displayed at the chat interface of a picker for the picker to gather the items on behalf of the customer.

11. The system of claim 9, wherein causing to display, via the chat interface, the set of two or more template messages comprises:

displaying a first template message that indicates the item is in a poor quality; and displaying a second template message that indicates the item is not available.

12. The system of claim 9, wherein causing to display, via the chat interface, the set of two or more template messages comprises displaying the set of two or more template messages in a slider or in a scrollable list.

13. The system of claim 9, wherein causing to display, via the chat interface, the set of two or more template messages comprises displaying one of the template messages that indicates to remove the item from the order.

14. The system of claim 9, wherein receiving, via the chat interface, one or more edits to the selected template message comprises:

causing the chat interface to display a camera icon; and receiving a picture of a replacement option from a picker taking the picture at a warehouse location.

15. The system of claim 9, wherein transmitting the edited template with the one or more edits to the client device comprises:

providing one or more replacement options that are transmitted along with the edited template;

retrieving user data describing previous orders and previously selected replacement options; and ranking a set of replacement options based on the user data.

16. The system of claim 9, wherein receiving a message indicating a course of action for the item comprises receiving a selection from a customer to replace the item with another item that is suggested in the template message.

17. A non-transitory computer-readable medium configured to store code comprising instructions, wherein the instructions, when executed by one or more processors, cause the one or more processors to perform steps comprising:

receiving an order, the order comprising a plurality of items;

causing to display, via a chat interface on a picker device, a scrollable list of the plurality of items;

receiving, via the chat interface, a selection of an item from the scrollable list, wherein the selection indicates that the item has an issue encountered during fulfillment of the order;

responsive to receiving the selection, causing to display, via the chat interface, a set of two or more template messages within a chat window specific to the order, wherein the set of two or more template messages is selected based on the selected item, wherein each of the template messages in the set specifies a potential issue, wherein the set of two or more template messages includes messages associated with one or more potential issues with the item, wherein each template message is an editable message for a picker to specify an issue with the item;

receiving a selection of one of the template messages in the set;

receiving, via the chat interface, one or more edits to the selected template message;

transmitting an edited template with the one or more edits to a client device, wherein transmitting the edited template message causes the chat interface on the picker device to render the edited message in the chat window specific to the order;

receiving, via the chat interface on the picker device, information related to a client response message rendered in the chat window specific to the order; and processing the client response message to display, via the chat window, a message indicating a course of action for the item.

18. The non-transitory computer-readable medium of claim 17, wherein receiving the order comprises:

receiving, from the client device, the plurality of items that are selected by a customer; and receiving a selection of a location to which the items are to be delivered; and wherein causing to display, via the chat interface, the scrollable list of the plurality of items comprises causing the scrollable list to be displayed at the chat interface of a picker for the picker to gather the items on behalf of the customer.

19. The non-transitory computer-readable medium of claim 18, wherein causing to display, via the chat interface, the set of two or more template messages comprises displaying the set of two or more template messages in a slider or in a scrollable list.

20. The non-transitory computer-readable medium of claim 17, wherein causing to display, via the chat interface, the set of two or more template messages comprises:

displaying a first template message that indicates the item is in a poor quality; and displaying a second template message that indicates the item is not available.

* * * * *